United States Patent [19]

Kendall et al.

[11] 4,344,711

[45] Aug. 17, 1982

[54] SELF-WIPING MULTIPLE SCREW ELEMENT MIXER

[75] Inventors: John A. Kendall, Gananoque; Ernest K. Marchildon, Kingston; Grant R. Stephenson, Deep River, all of Canada

[73] Assignee: Du Pont Canada Inc., Mississauga, Canada

[21] Appl. No.: 226,883

[22] Filed: Jan. 21, 1981

[30] Foreign Application Priority Data

Jan. 29, 1980 [CA] Canada .................................. 344594

[51] Int. Cl.[3] ............................ B01F 7/24; B29B 1/10

[52] U.S. Cl. ...................................... 366/83; 366/301; 366/323

[58] Field of Search ................ 425/204, 208; 366/301, 366/322, 323, 297, 83, 84, 85, 88, 90

[56] References Cited

U.S. PATENT DOCUMENTS 3,717,330 2/1973 Pinney ................................ 366/301

4,090,261 5/1978 Iwasyk ............................ 366/323 X

*Primary Examiner*—Philip R. Coe

*Assistant Examiner*—Christine Peterson

[57] ABSTRACT

An improved mixing apparatus involves a vessel having an interior surface in the shape of at least two intersecting conical frustums with axes parallel and substantially vertical. At least two interengaging helical screw elements are rotatably mounted within the vessel such that when co-rotated they interengage along their length and also conform to the interior surface of the vessel to effect a complete cleaning of each other and of the interior surface of the vessel. The bottom portion of the screw elements form a pressure generating zone and the upper portion of the screw elements form a mixing zone having a hollow center described by the co-rotating screw elements. In the mixing zone each screw element includes a continuous transition from a multilobal cross-section, e.g., trilobal cross-section (bounded by three equal arcs), to a circular cross-section. The circular cross-sections of the screw elements in the upper part of the mixing zone, i.e., above the liquid level, provide greater screw element-to-screw element shear than do the multilobal cross-sections of the screw elements according to the prior art. The mixing apparatus is useful, for example, for finishing high viscosity synthetic polymers such as polyamides, polyesters, etc.

16 Claims, 11 Drawing Figures

SELF-WIPING MULTIPLE SCREW ELEMENT MIXER

BACKGROUND OF THE INVENTION

1. Field of the Invention

This invention relates broadly to a mixing apparatus and more particularly to such an apparatus of conical configuration with vertically mounted rotating screw elements which fully wipe the interior surfaces of the mixing apparatus and the surfaces of each other. The mixing apparatus is useful, for example, as a separator/-finisher for producing high viscosity synthetic condensation polymers such as polyamides, polyesters, etc.

The term "mixing" used herein includes finishing high viscosity synthetic polymers, mixing two or more viscous liquids and blending solids and liquids together.

2. Description of the Prior Art

U.S. Pat. No. 3,717,330, issued Feb. 20, 1973 to B. M. Pinney, describes a mixing apparatus suitable for use as a separator/finisher in the production of synthetic condensation polymers such as polyamides and polyesters. The apparatus disclosed by Pinney includes a vessel having an interior surface throughout its length in the shape of at least two intersecting conical frustums with parallel and substantially vertical axes, the bases of the frustums being displaced upwards with respect to the apexes. Rotatably mounted within the vessel are at least two interengaging helical screw elements which upon co-rotation conform to the interior surface of the vessel such that the screw elements effect a complete wiping of the interior surface of the vessel, and the screw elements interengage each other uninterruptedly along their lengths such that each element effects a complete wiping of the adjacent element. The bottom portions of the screw elements form a pressure generating zone, and the top portions of the screw elements form a mixing zone having a hollow center described by the co-rotating screw elements. The screw elements frequently have multilobal cross-sections, for example, trilobal cross-sections, and in the mixing zone may be oriented so that the tip of the screw element or the "flank" of the screw element (arc of the multilobal cross-section instead of the tip of the multilobal cross-section) is adjacent to the vessel wall.

As used herein, the term "multilobal cross-section" means a cross-section bounded by a plurality of equal arcs of equal radii, the centers of the arcs being within the figure formed by joining adjacent intercepts of the arcs by straight lines and the terms "trilobal cross-section" and "pentalobal cross-section" means a cross-section bounded by three such equal arcs and a cross-section bounded by five such equal arcs, respectively.

When such an apparatus is used for the preparation of polymers, e.g., polyhexamethylene adipamide, which are particularly susceptible to thermal degradation, deposits of degraded polymer often referred to as "gel" may have a tendency to form in the upper part of the mixing zone, i.e., above the liquid (melt pool) level in the vessel. The tendency to form gel may be minimized by maintaining complete wetting and adequate shearing of all surfaces. Complete surface wetting can be maintained by requiring the helix angle (with a horizontal plane) of the screw elements above the liquid level in the vessel to be sufficiently high to allow the screw elements to convey polymer upwards from the melt pool and to distribute incoming polymer which enters through the top of the vessel around the periphery of the vessel. Adequate shearing between the screw elements and the vessel walls can be obtained by arranging the multilobal cross-section of each screw element above the liquid level such that a flank of the screw element is adjacent to the vessel wall, thus providing a greater duration of shearing between the screw elements and the vessel walls than is provided by arranging the multilobal cross-section of each screw element above the liquid level such that a tip of the screw element is adjacent to the vessel wall. However, regardless of the arrangement of the multilobal cross-sections of the screw elements with respect to the vessel walls, the screw element-to-screw element shear may be inadequate as the wiping action between the screw elements is a "tip wiping" type, i.e., a tip of one multilobal cross-section wipes a flank of the other multilobal cross-section. It was recognized that improved screw element-to-screw element shear could be achieved in the upper part of the mixing zone by utilizing screw elements of circular cross-section. However, screw elements of multilobal cross-section may be desirable in the pressure generating zone of the vessel.

SUMMARY OF THE INVENTION

It has now been found that screw elements with circular cross-sections in the upper part of the mixing zone of the vessel and with multilobal, e.g., trilobal, cross-sections in the pressure generating zone of the vessel may be provided by installing in each screw element a continuous transition from a multilobal, e.g., trilobal, cross-section to a circular cross-section, the transition commencing with a slight rounding of each tip of the multilobal cross-section at a small tip arc radius, the tip arc radius of each tip continuously increasing and the flank arc radius of each flank continuously decreasing throughout the length of the transition such that at the end of the transition each tip arc radius and each flank arc radius is equal to the radius of a circular cross-section formed by the merging of the tip arc radii and the flank arc radii, the screw elements throughout their length, including the transition, effecting a complete wiping of the interior surfaces of the vessel and the surfaces of each other.

Accordingly, the present invention provides an improvement in a mixing apparatus including an enclosed vessel having an interior surface throughout its length in the shape of at least two intersecting conical frustums with axes parallel and substantially vertical, the base of the frustums being displaced upward with respect to the apexes, at least two interengaging helical screw elements having multilobal cross-sections and rotatably supported on shafts passing through seals in the base of the vessel, the number of frustums and the number of screw elements being equal, the screw elements when co-rotated conforming to the interior surface of the vessel such that the screw elements effect a complete wiping of the interior surface, and wherein the screw elements interengage uninterruptedly along their lengths such that each element effects a complete wiping of the adjacent element, the bottom portion of the screw elements forming a pressure generating zone and the top portion of the screw elements forming a mixing zone having a hollow center described by the co-rotating screw elements, the mixing zone extending above the vessel's liquid level, the improvement comprising:

a continuous rounded-tip transition from a multilobal cross-section to a circular cross-section in each of the screw elements in the mixing zone, the cross-sections throughout the transitions being defined by the equations:

$$R_t=\eta C_L/2 \quad (1);$$

$$D_t=(1-\eta)C_L/(2\cos(\pi/(2n))) \quad (2);$$

$$R_f=(1-\eta/2)C_L \quad (3);$$

$$D_f=D_t \quad (4);$$

$$\alpha=\pi/n \quad (5);$$

wherein $R_t$ is the tip arc radius of each tip, $\eta$ is a "degree of tip rounding" parameter, $C_L$ is the distance between adjacent parallel axes of the conical frustums (and of the centroids of the cross-sections of the screw elements), $D_t$ is the distance measured along the tip arc bisector to the tip arc center from the centroid of the cross-section, n is the number or tips of the multilobal cross-section and is an odd number in the range of 3 to 9, $R_f$ is the radius of the flank arcs which connect adjacent tip arc radii, $D_f$ is the distance measured along the flank arc bisector to the flank arc center from the centroid of the cross-section, $\alpha$ is the angle subtended by each tip arc and by each flank arc, and wherein $\eta$ increases continuously throughout the transition from 0 to 1.

In three other embodiments of the apparatus of the present invention, the degree of tip rounding parameter, $\eta$, increases continuously throughout the transition from 0 up to less than 1, from greater than 0 up to 1 and from greater than 0 up to less than 1 respectively.

In yet another embodiment of the apparatus of the present invention, the number of tips, n, is equal to five, i.e., the transition is from a pentalobal cross-section to a circular cross-section.

In yet another embodiment of the apparatus of present invention, n is equal to three, i.e., the transistion is from a trilobal cross-section to a circular cross-section.

DESCRIPTION OF THE DRAWINGS

Embodiments of the present invention will be described in greater detail with the aid of the accompanying drawings in which.

DETAILED DESCRIPTION OF THE INVENTION

Figure 1:
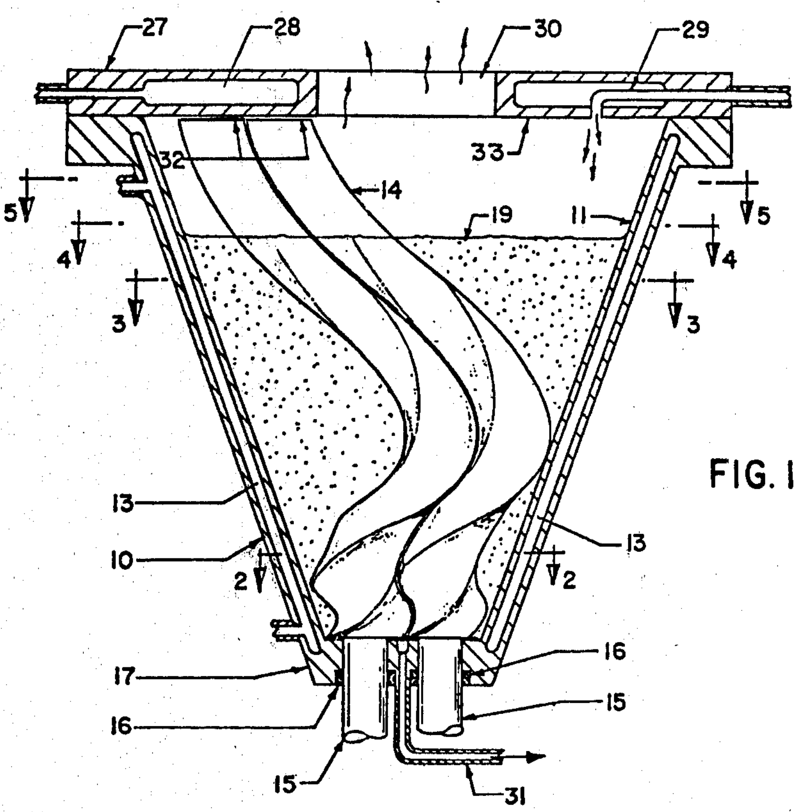
FIG. 1 is a vertical sectional view of one embodiment of an apparatus according to this invention, useful, for example, for finishing high viscosity polymer.

Referring to the drawings, FIG. 1 shows an apparatus for finishing high viscosity polymer which includes a vessel 10 having interior surface 11 in the shape of two intersecting frustums of cones with parallel axes. The axes are generally substantially vertical and the base of each of the cones is displaced upwards with respect to the cone apexes. A heating jacket 13, adapted to contain a vapor or liquid heating medium, e.g., a 73.5% diphenyl oxide—26.5% biphenyl mixture available as DOWTHERM® A, surrounds interior surface 11. Other heating means, e.g., an electrical heating jacket may be substituted for heating jacket 13.

Figure 2:
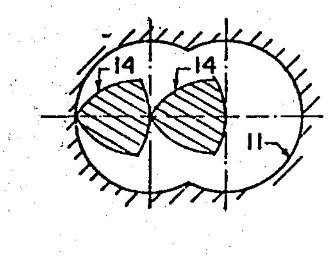
FIG. 2 is a cross-sectional view of the interengaging screw elements taken at 2—2 in FIG. 1.

Inside the vessel 10 are two co-rotating interengaging screw elements 14 connected to shafts 15 which pass through seals 16 in the bottom 17 of the vessel. The screw elements 14 wipe each other throughout their length and also wipe the entire interior surface 11 of the vessel 10, including the top and bottom plates of the conical frustums. The cross-section of each of the screw elements from the bottom of the screws up to section 2—2, is such that pressure generating characteristics are obtained. These pressure generating characteristics need only occur from the bottom of the screws to approximately halfway up to section 2—2. The geometric development of these portions of the twin screws incorporating self-wiping features is well-known in the art, as is pointed out in the aforementioned U.S. Pat. No. 3,717,330. There are many types of intermeshing screw configurations which are all suitable for this application. In one configuration, the cross-section of each intermeshing screw element is trilobal as shown in FIG. 2. The part of the vessel 10 between its bottom and section 2—2 is hereinafter referred to as the pressure generating zone.

At section 2—2, the cone radii are equal to their center-to-center distance. Above section 2—2, the conical vessel 10 continues to increase in diameter but the cross-sectional area of the screw elements does not increase appreciably. Therefore, the relationship between the vessel 10 and screw elements 14 begins to change, in that a hollow center 18 (see FIG. 3) begins to appear because of the increasing diameter of the vessel 10. This so-called hollow center 18 is not traversed by any part of the screw elements. The maximum size of hollow center 18 occurs at the top of the screw elements 14. The part of the vessel 10 between section 2—2 and the top of the screw element is referred to as the mixing zone. Mixing and circulation of high viscosity polymer occur in the melt pool in the lower part of this zone, and thin film generation and vapor diffusion occur in the upper part of the zone. As shown in FIG. 1, the liquid level 19 divides the mixing zone into an upper part and a lower part. The level 19 may be raised if more mixing and circulation is required, or lowered if it is desired to have a greater part of the vessel acting as a thin film generator and vapor disengagement section.

Between section 3—3 and section 5—5 in the mixing zone, preferably near the liquid level, the screw elements each have a continuous transition from a multilobal cross-section to a circular cross-section, the transitions being defined by the following equations:

$$R_t = \eta C_L/2 \quad (1);$$

$$D_t = (1-\eta)C_L/(2\cos(\pi/(2n))) \quad (2);$$

$$R_f = (1-\eta/2)C_L \quad (3);$$

$$D_f = D_t \quad (4);$$

$$\alpha = \pi/n \quad (5);$$

wherein

- $R_t$ is the tip arc radius of each tip,
- $\eta$ is a "degree of tip rounding" parameter,
- $C_L$ is the distance between the two parallel axes of the conical frustums (and of the centroids of the cross-sections of the screw elements),
- $D_t$ is the distance measured along the tip arc bisector to the tip arc center from the centroid of the cross-section,
- n is the number of tips of the multilobal cross-section and is an odd number in the range of 3 to 9,
- $R_f$ is the radius of the flank arcs which connect adjacent tip arc radii,
- $D_f$ is the distance measured along the flank arc bisector to the flank arc center from the centroid of the cross-section,
- $\alpha$ is the angle subtended by each tip arc and by each flank arc, and wherein

- $\eta$ increases continuously throughout the transition from 0 to 1.

The above equations, which define a continuous transition from a multilobal cross-section to a circular cross-section, provide for continuous physical contact between the screw elements. In practice, screw element-to-screw element clearance is usually required and this can be obtained by an appropriate reduction in the value of $C_L$ used in the equations.

Figure 8:
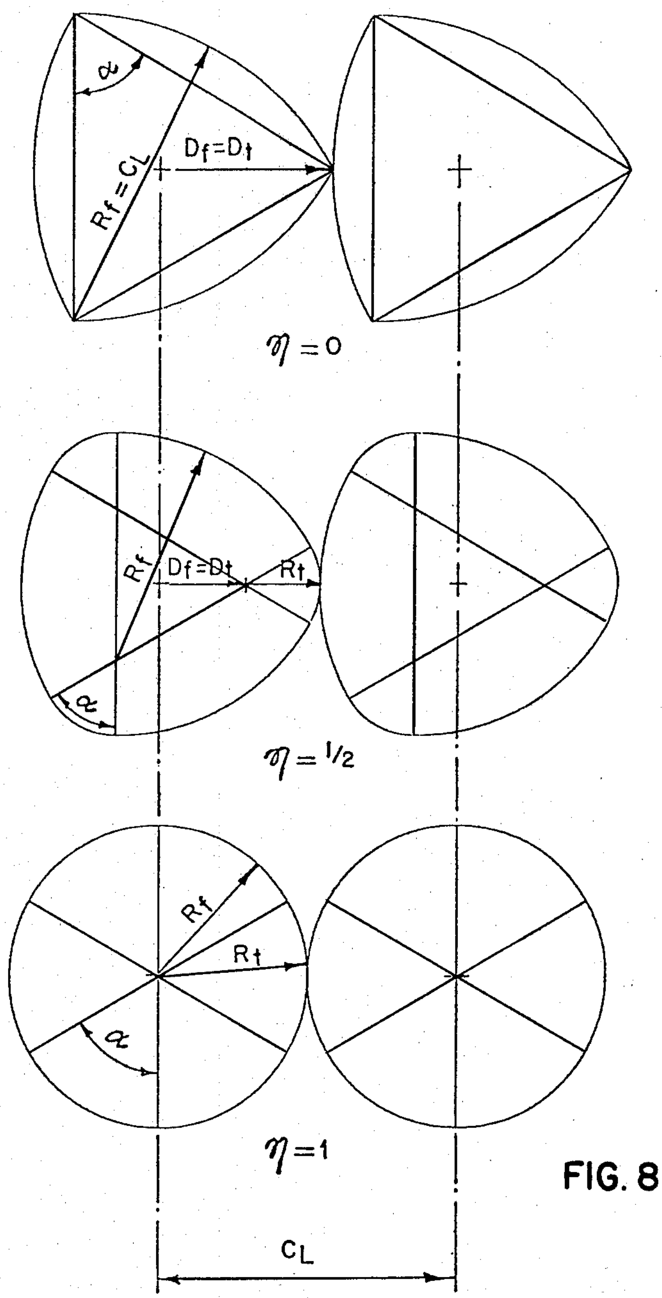
FIG. 8 is a representation of the cross-sections of a pair of screw elements containing a transition from a .rilobal cross-section to a circular cross-section at three points in the transition, namely, at the beginning, one halfway through and at the end.

It will be noted from the above that the cross-sections defined by equations (1) to (5) are multilobal when $\eta=0$, and are circular when $\eta=1$. A pictorial representation of the cross-sections defined by the equations for n=3 L and $\eta=0$, $\frac{1}{2}$ and 1 is shown in FIG. 8.

Figure 5:
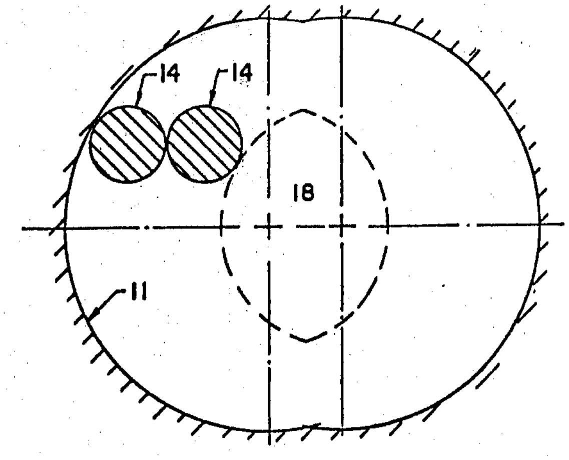
FIG. 5 is a cross-sectional view of the interengaging screw elements taken at 5—5 in FIG. 1.
Figure 4:
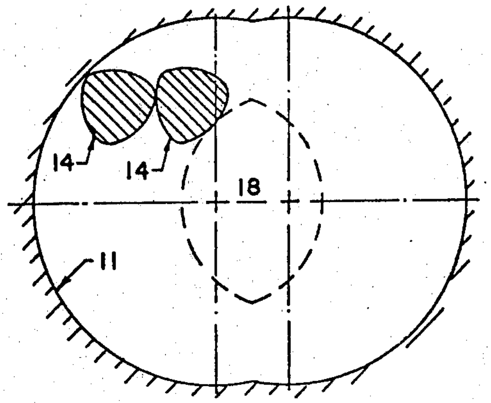
FIG. 4 is a cross-sectional view of the interengaging screw elements taken at 4—4 in FIG. 1.
Figure 3:
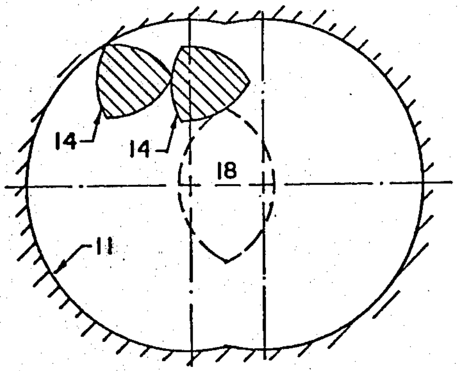
FIG. 3 is a cross-sectional view of the interengaging screw elements taken at 3—3 in FIG. 1.
Figure 6:
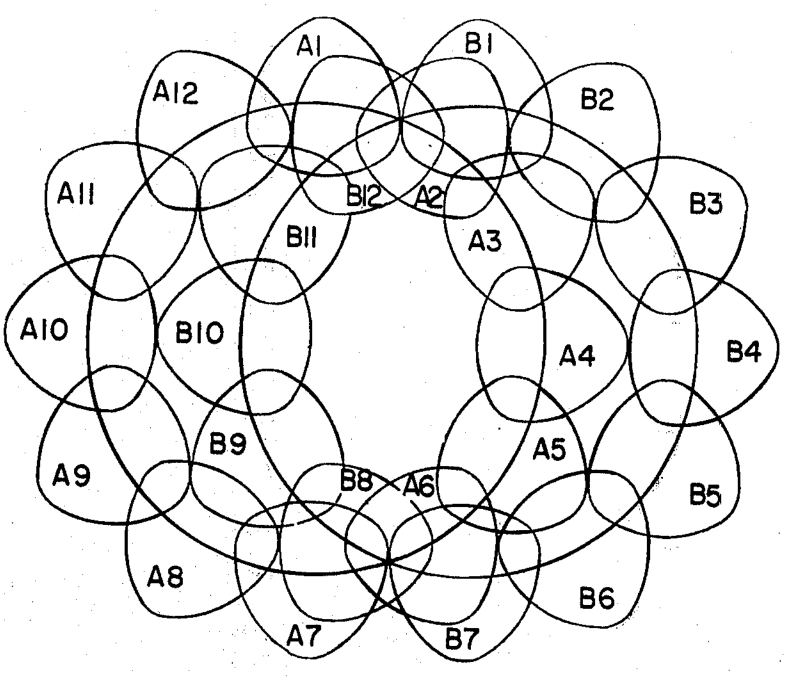
FIG. 6 is a drawing showing 12 separate instantaneous positions assumed by the cross-sections of a pair of interengaging screw elements (the cross-section being taken halfway through, i.e., $\eta=\frac{1}{2}$, a transition from trilobal to circular cross-section) during one complete revolution of the screw elements.

FIG. 3 shows the trilobal cross-section of screw elements 14 at the beginning of the transition, i.e., $\eta=0$, FIG. 4 shows the cross-section of the elements 14 halfway through the transition, i.e., $\eta=\frac{1}{2}$ and FIG. 5 shows the circular cross-section of the elements at the completion of the transition, i.e., $\eta=1$. FIG. 6 is a copy of a computer simulation showing 12 separate instantaneous positions (marked A1 to A12 and B1 to B12 respectively) assumed by the cross-sections of a pair of interengaging screw elements. The cross-sections are taken halfway through, i.e., ($\eta=\frac{1}{2}$) the transition from a trilobal (n=3) to a circular cross-section. It may be readily observed from FIG. 6 that the screw elements are completely self-wiping.

Figure 7:
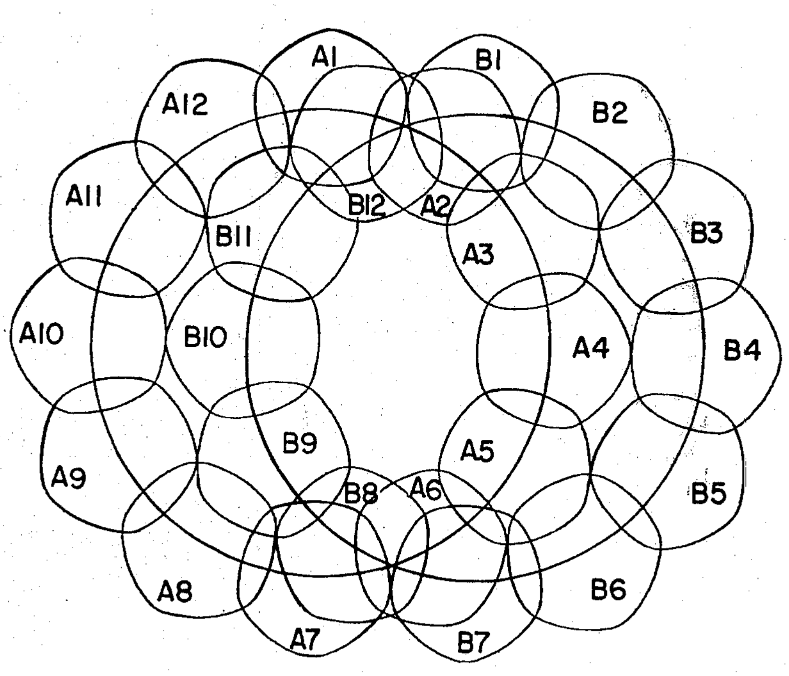
FIG. 7 is a drawing showing 12 separate instantaneous positions assumed by the cross-sections of a pair of interengaging screw elements (the cross-section being taken halfway through, i.e., $\eta=\frac{1}{2}$, a transition from pentalobal to circular cross-section) during one complete revolution of the screw elements.

FIGS. 3, 4, 5, 6 and 8 show screw element cross-sections at several positions through a transition from trilobal to circular cross-section. As indicated above, other transitions are possible, i.e., from multilobal to circular cross-section, the number of tips in the multilobal cross-sections being an odd number greater than one and preferably in the range of from 3 to 9, FIG. 7 is a copy of a computer simulation similar to that shown in FIG. 6, the cross-sections taken halfway through, i.e., $\eta=\frac{1}{2}$ a transition from pentalobal (n=5) to circular cross-section.

The axial length of the transitions is not critical. However, the transitions should not be so short as to cause construction problems due to a very rapid change of shape. Transitions having an axial length in the order of from 5 percent to 20 percent of the total length of the vessel are generally satisfactory.

In the embodiment shown in FIG. 1, a top plate 27 encloses the vessel 10. A hollow recess 28 inside top plate 27 is adapted to contain a liquid heating medium. Inlet pipe 29 extends through top plate 27 to provide polymer feed to vessel 10 and a vent 30, in top plate 27 coincident with the hollow center 18 described by screw elements 14 at their top (see FIGS. 3–5), allows vapor by-products to exit from vessel 10. The screw elements 14 terminate in substantially flat ends 32 designed to wipe the inner surface 33 of top plate 27. Clearances in the mixing section between the two screw elements 14, the interior surfaces 11 and the top surfaces 33 may be about from 0.8 mm to 6.0 mm. In the pressure generating zone, tighter clearances about from 0.125 mm to 1.6 mm may be required for adequate pressurization.

In the upper part of the mixing zone, (i.e., above the liquid level), it may be advantageous (in order to provide better surface wetting of the interior surface 11 of the vessel 10) to increase the helix angle of screw elements 14 up to a maximum helix angle of 90 degrees at the top of the vessel 10.

In operation, the polymer for finishing is fed into the vessel 10 through inlet pipe 29. The flow of polymer feed is controlled so that level 19 of the melt pool remains substantially constant. The polymer is picked up by the screw elements 14 and deposited on the interior surface 11 of the vessel 10. The polymer is then forced down into the melt pool by the wiping action of screw elements 14 and by gravitational action, leaving in the upper part of the mixing zone, a thin film of polymer on the interior surface 11 of vessel 10 and on the screw elements 14. The thin film is constantly being replenished and exposed to the vessel atmosphere so that volatile by-products are diffused, thus aiding in the mixing and finishing of the polymer. Because of their rounded wiping surfaces, the circular cross-sections of the screw elements 14 in the upper part of the mixing zone above the transition provide a longer duration of shearing between the interengaging surfaces of screw elements 14 than is provided, for example, by trilobal cross-sections. This longer duration of shearing between the above surfaces appears to reduce the tendency for formation of deposits of degraded polymer, often referred to as "gel".

The polymer in the pool below level 19 is forced down the interior surface 11 of vessel 10 by rotating motion of screw elements 14. Excess polymer, which does not enter the pressure generating zone, passes up through the hollow center 18 between the screw elements 14 and recirculates again down interior surface 11. Vapors given up during the recirculation pass up through the hollow center 18 and exit from the vessel 10 through the central vent 30.

The polymer entering the pressure generating zone is pressurized and pumped out the bottom of vessel 10 through the discharge pipe 31.

Figure 10:
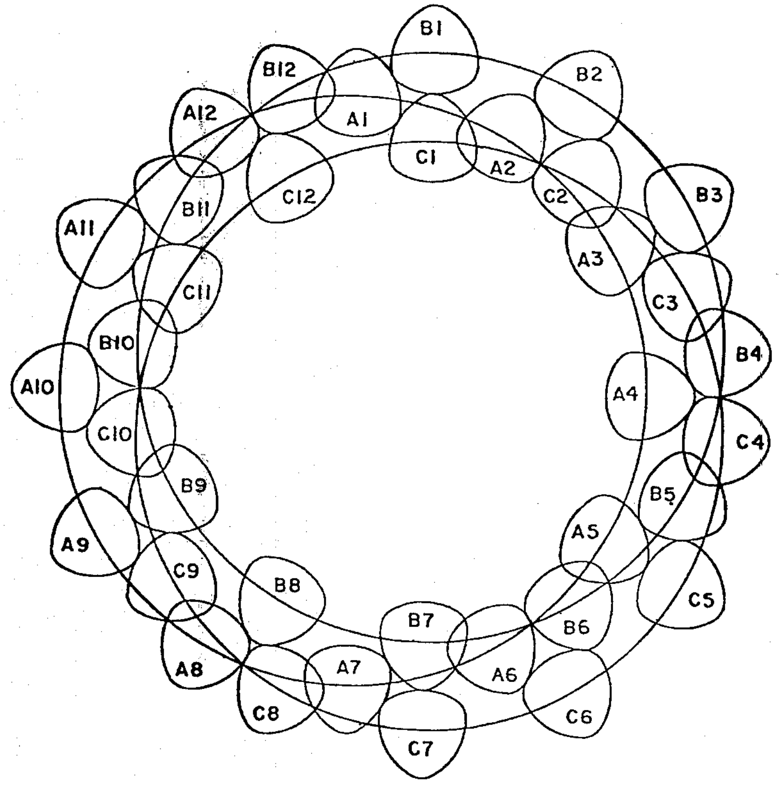
FIG. 10 is a drawing showing 12 separate instantaneous positions assumed by the cross-sections of three interengaging screw elements, the axes of rotation of which being in the shape of an equilateral triangle, (the cross-section being taken halfway through, i.e., $\eta=\frac{1}{2}$, a transition from trilobal to circular cross-section) during one complete revolution of the screw elements.
Figure 11:
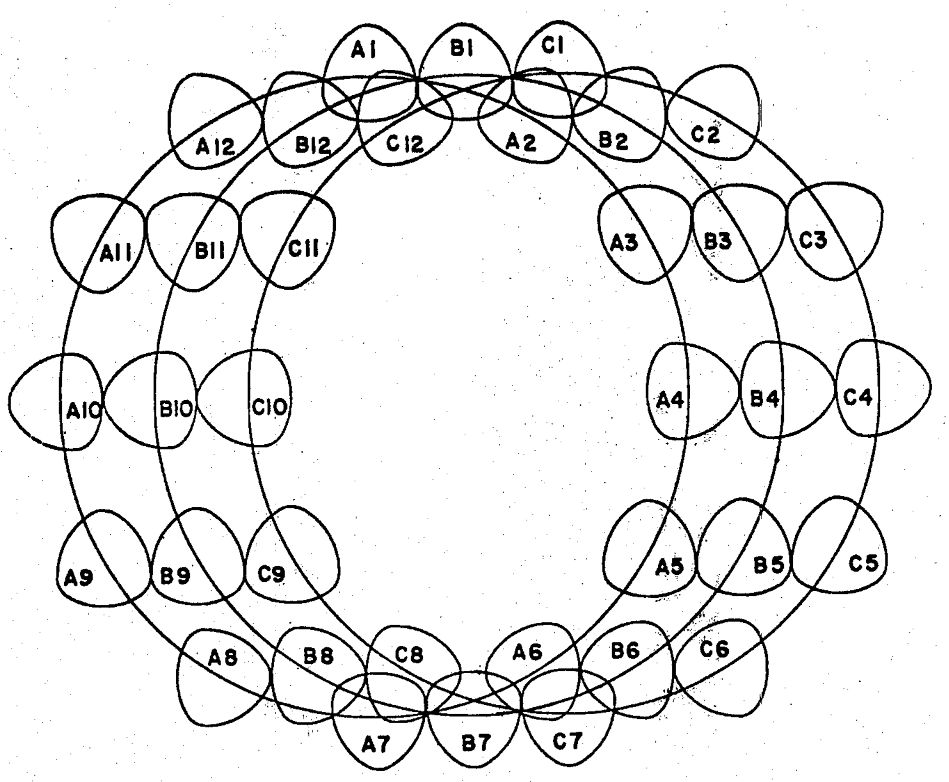
FIG. 11 is a drawing showing 12 separate instantaneous positions assumed by the cross-sections of three interengaging screw elements, the axes of rotation of which being in a straight line, (the cross-section being taken halfway through, i.e. $\eta=\frac{1}{2}$, a transition from trilobal to circular cross-section) during one complete revolution of the screw elements.

The above discussion of embodiments of the present invention is concerned with vessels having internal surface in the shape of two intersecting conical frustums with two screw elements rotatably mounted within the vessels. It will be appreciated that the present invention also covers vessels having internal surface in the shape of more than two intersecting conical frustums with more than two screw elements rotatably mounted in the vessel. FIG. 10 and FIG. 11 each show 12 instantaneous positions assumed by the cross-sections of three interengaging screw elements (the cross-section being taken halfway through, i.e., $\eta = \frac{1}{2}$, a transition from trilobal to circular cross-section) during one complete revolution of the screw elements. In FIG. 10 the axes of rotation of the three screw elements (and the axes of the three conical frustums) are arranged in the shape of an equilateral triangle. In FIG. 11 the axes of rotation of the three screw elements (and the axes of the three conical frustums) are arranged in a straight line.

The present invention is illustrated by the following example:

EXAMPLE

A scale model of a mixing apparatus (similar to that shown in FIG. 1) was constructed from PLEXIGLAS® plastic, together with a gearbox and drive assembly for driving a pair of screw elements. The vessel had the geometry of two 40°, inverted, intersecting, conical frustums having parallel vertical axes separated by a distance of 3.7 cm. The vertical height of the vessel was 26.7 cm.

Two sets of two interengaging helical screw elements were prepared for the vessel: one set according to the present invention had a transition in the mixing zone of the vessel from a trilobal cross-section to a circular cross-section; and a second set according to the prior art had a trilobal cross-section with no such transition. Some characteristics of each set of screw elements are given below in Table I.

Figure 9:
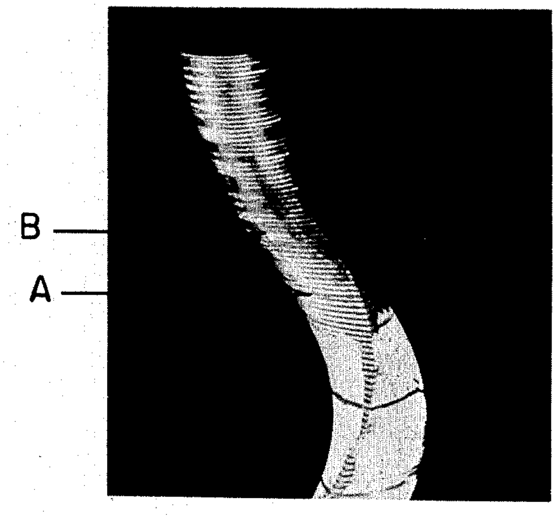
FIG. 9 is a copy of a photograph of the upper part of a partially constructed screw element containing a transition from a trilobal cross-section to a circular cross-section.

The upper portions of the above screw elements according to the present invention were each made from a number of discs. FIG. 9 is a copy of a photograph of the upper portion of one of these screw elements prior to completion. The beginning of the transition from trilobal cross-section (i.e., 7.88 cm from the top of the screw element) is indicated by A, and the end of the transition to circular cross-section (i.e., 5.45 cm from the top of the screw element) is indicated by B.

For each set of screw elements, tests were run using corn syrup as a fluid medium to simulate polymer conditions. In each test the static liquid level in the vessel was 6.45 cm from the top of the screw elements (i.e., at approximately the middle of the transition from trilobal to circular cross-section for the set of screw elements according to the present invention).

TABLE I

| | Vertical Distance From Top of Screw Element | Present Invention | Prior Art |
|---|---|---|---|
| Helix Angle | 26.67 cm to 7.88 cm | 33° | 33° |
| | 7.88 cm to 7.50 cm | varies elliptically from 33° to 34° 19' | varies elliptically from 33° to 34° 19' |
| | 7.50 cm to 0.00 cm | varies linearly from 34° 19' to 90° | varies linearly from 34° 19' to 90° |
| Cross Section | 26.67 cm to 7.88 cm | trilobal | trilobal |
| | 7.88 cm to 5.45 cm | transition trilobal to circular | trilobal |
| | 5.45 cm to 0.00 cm | circular | trilobal |
| Section Orientation to Wall | 26.67 cm to 7.88 cm | "tip-out" (i.e., one tip normal to wall) | "tip-out" (i.e., one tip normal to wall) |
| | 7.88 cm to 4.44 cm | "tip-out" (i.e., one tip normal to to wall) | varies elliptically from 0° ("tip-out") to 16° 43' |
| | 4.44 cm to 0.00 cm | "tip-out"* (i.e., one tip normal to wall) | varies linearly from 16° 43' to 60° (i.e., "flank-out"-one flank normal to wall) |

*This has no significance for a circular cross-section.

At the start of each of a first set of tests, the static liquid level was checked and the fluid viscosity (in poise) was measured with a Brookfield® viscometer. Then the screw elements were rotated at low speed and the fluid wave height in front of each screw element and the wave trough behind each element, the amount of wetting and shearing occurring at the vessel wall and screw element surfaces were observed. The minimum screw element speed in r/min to provide full screw element and wall wetting was recorded. The results are tabulated below in Table II.

TABLE II

| | Minimum r/min for full wetting | | | |
|---|---|---|---|---|
| | Present Invention | | Prior Art | |
| Static Liquid (pool) Level | Viscosity = 32 Pa.s (320 poise) | Viscosity = 90 Pa.s (900 poise) | Viscosity = 29 Pa.s (290 poise) | Viscosity = 75 Pa.s (760 poise) |
| 6.45 cm from top of the screw elements | 9.97 | 5.76 | 7.41 | 5.43 |

In a second set of tests in order to simulate actual polymer finisher process conditions, the effect of a low viscosity feed entering from the top of the vessel on the minimum screw element speed (in r/min) was measured. It was observed that the low viscosity feed had an adverse effect on the ability of the screw elements to wet the vessel wall by reducing the size of the wave pushed in front of each screw element. In order to maintain full vessel wetting conditions and a roll of fluid on the leading surface of the screw elements, the speed of the screw elements had to be increased substantially. The results are tabulated below in Table III.

TABLE III

| | Static Liquid (pool) Level | Liquid (pool) Viscosity Pa.s (poise) | Feed Rate (g/min) | Feed Viscosity Pa.s (poise) | r/min for full wetting |
|---|---|---|---|---|---|
| Present Invention | 6.45 cm from top of screw elements | 29.5 (295) | 0 | — (—) | 18.40 |
| | | 29.5 (295) | 23 | 0.5 (5) | 28.17 |
| Prior Art | 6.45 cm from top of screw elements | 29.3 (293) | 0 | — (—) | 15.69 |
| | | 29.3 (293) | 23 | 0.5 (5) | 23.15 |

In each of the above tests to assist in the visual observation of the wetting and shearing action of the screw element surfaces, a deep blue dye was applied carefully with a spatula to regions of interest of the screw elements above the liquid level in the vessel while the screw elements were in motion. The speed with which the dye was dispersed into the liquid pool was noted. It was observed that when the dye was applied to the set of screw elements according to the present invention, which were circular or substantially circular in cross-section, the dye disappeared very rapidly, e.g., after only one revolution of the screw elements. In contrast, it was observed that when the dye was applied to the set of screw elements according to the prior art, which were trilobal in cross-section and in the "flank-out" position at the top of the vessel, the dye did not disappear as quickly, e.g., it took up to several revolutions of the screw elements to disappear. It was also observed that more material remained on the surface of these screw elements than remained on the surface of the screw elements according to the present invention.

Tables II and III indicate that with the set of screw elements according to the present invention, a somewhat higher screw element speed was required to achieve complete vessel wetting than was required with the prior art trilobal screw elements. It is believed that differences in screw element to wall clearance account for at least some of the difference noted in the minimum screw element speed required.

The above-described "dye dispersion" tests indicate that the screw element-to-screw element shear between the screw elements according to the present invention, was considerably greater than the screw element-to-screw element shear between the screw elements according to the prior art.

We claim:

1. In a mixing apparatus including an enclosed vessel having an interior surface throughout its length in the shape of at least two intersecting conical frustums with axes parallel and substantially vertical, the base of the frustums being displaced upward with respect to the apexes, at least two interengaging helical screw elements having multilobal cross-sections and rotatably supported on shafts passing through seals in the base of the vessel, the number of frustums and the number of screw elements being equal, the screw elements when co-rotated conforming to the interior surface of the vessel such that the screw elements effect a complete wiping of the interior surface, and wherein the screw elements interengage uninterruptedly along their lengths such that each element effects a complete wiping of the adjacent element, the bottom portion of the screw elements forming within the vessel a pressure generating zone and the top portion of the screw elements forming a mixing zone having a hollow center described by the co-rotating screw elements, the mixing zone extending above the vessel's liquid level, the improvement comprising:

a continuous rounded-tip transition from a multilobal cross-section to a circular cross-section in each of the screw elements in the mixing zone, the cross-sections throughout the transitions being defined by the equations:

$$R_t = \eta C_L/2$$

$$D_t = (1-\eta)C_L/(2\cos(\pi/(2n)))$$

$$R_f = (1-\eta/2)C_L$$

$$D_f = D_t$$

$$\alpha = \pi/n$$

wherein $R_t$ is the tip arc radius of each tip, $\eta$ is a "degree of tip rounding" parameter, $C_L$ is the distance between adjacent parallel axes of the conical frustums (and of the centroids of the cross-sections of the screw elements), $D_t$ is the distance measured along the tip arc bisector to the tip arc center from the centroid of the cross-section, n is the number of tips of the multilobal cross-section and is an odd number in the range of 3 to 9, $R_f$ is the radius of the flank arcs which connect adjacent tip arc radii, $D_f$ is the distance measured along the flank arc bisector to the flank arc center from the centroid of the cross-section, $\alpha$ is the angle subtended by each tip arc and by each flank arc, and wherein $\eta$ increases continuously throughout the transition from 0 to 1.

2. The apparatus according to claim 1 wherein the degree of tip rounding parameter ($\eta$) increases continuously throughout the transition from 0 up to less than 1.

3. The apparatus according to claim 1 wherein the degree of tip rounding parameter ($\eta$) increases continuously throughout the transition from greater than 0 up to 1.

4. The apparatus according to claim 1 wherein the degree of tip rounding parameter ($\eta$) increases continuously throughout the transition from greater than 0 up to less than 1.

5. The apparatus according to claim 1 wherein the number of tips of the multilobal cross-section (n) is five, the transition being from a pentalobal cross-section to a circular cross-section.

6. The apparatus according to claim 1 wherein the number of tips of the multilobal cross-section (n) is three, the transition being from a trilobal cross-section to a circular cross-section.

7. The apparatus according to claim 1 wherein the enclosed vessel has an interior surface throughout its length in the shape of two intersecting conical frustums, and wherein the number of interengaging helical screw elements is two.

8. The apparatus according to claim 7 wherein the degree of tip rounding parameter ($\eta$) increases continuously throughout the transition from 0 up to less than 1.

9. The apparatus according to claim 7 wherein the degree of tip rounding parameter ($\eta$) increases continuously throughout the transition from greater than 0 up to 1.

10. The apparatus according to claim 7 wherein the degree of tip rounding parameter ($\eta$) increases continuously throughout the transition from greater than 0 up to less than 1.

11. The apparatus according to claim 7 wherein the number of tips of the multilobal cross-section (n) is five, the transition being from a pentalobal cross-section to a circular cross-section.

12. The apparatus according to claim 7 wherein the number of tips of the multilobal cross-section (n) is three, the transition being from a trilobal cross-section to a circular cross-section.

13. The apparatus according to claim 12 wherein the vessel has an entrance and a vent in the upper portion of the vessel, and a discharge in the lower portion of the vessel.

14. The apparatus according to claim 13 wherein the vessel has a flat top cover and the vent is in the cover coincident with the hollow center described by the co-rotating screw elements and wherein the screw elements have substantially flat upper surfaces which when the elements are co-rotated conform to the inner surface of the cover to effect complete wiping thereof.

15. The apparatus according to any one of claim 11, 12 or 14, wherein the helix angle of the helical screw elements increases continuously to 90 degrees in the upper part of the mixing zone.

16. The apparatus according to any one of claim 11, 12 or 14, wherein the axial length of the transition is in the range of from 5 percent to 20 percent of the total length of the vessel.

* * * * *